I. DE HAAN.
SAFETY DEVICE FOR BUNSEN BURNERS, GAS COOKING RANGES, AND THE LIKE.
APPLICATION FILED NOV. 22, 1913.
1,093,180.  
Patented Apr. 14, 1914.
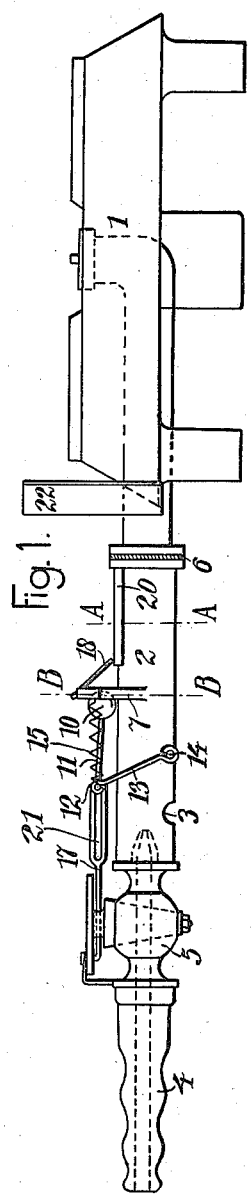
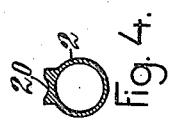
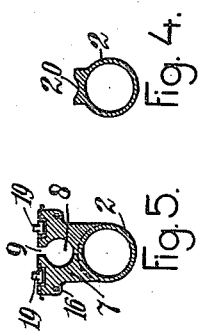
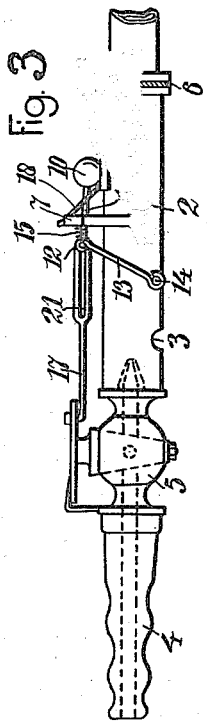
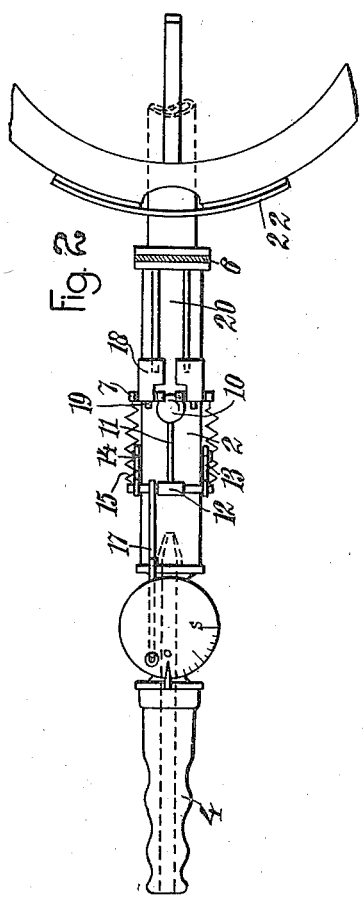
WITNESSES  
INVENTOR  
Isidore de Haan  
By  
His Attorney

UNITED STATES PATENT OFFICE.

ISIDORE DE HAAN, OF AMSTERDAM, NETHERLANDS.

SAFETY DEVICE FOR BUNSEN BURNERS, GAS COOKING-RANGES, AND THE LIKE.

1,093,180.

Specification of Letters Patent.

Patented Apr. 14, 1914.

Application filed November 22, 1913. Serial No. 802,454.

*To all whom it may concern:*

Be it known that I, ISIDORE DE HAAN, a subject of the Queen of the Netherlands, and residing at 6 Nieuwe Keizersgracht, Amsterdam, Netherlands, have invented certain new and useful Improvements in Safety Devices for Bunsen Burners, Gas Cooking-Ranges, and the like, of which the following is a specification.

This invention relates to a safety device for Bunsen burners, gas cooking ranges and the like and has for its object to prevent accidents which might happen when the flame of a gas burner flashes back into the mixing tube. As known the gas inlet pipe is often heated to such an extent by this back flash that the rubber tube melts off and the freely escaping gas is ignited by the flame in the mixing tube.

This invention is based upon the principle of utilizing the heating of the mixing tube by the back flash for the expanding of an element, which allows a mechanism to be actuated under the influence of a tensioned spring or the like, said mechanism shutting off the flow of gas by closing the gas cock.

The accompanying drawing illustrates by way of example a gas cooking range with a safety device according to the present invention.

Figure 1 is an elevation of the gas range provided with the safety device; Fig. 2 is a plan view of the same with parts of the gas range broken away; Fig. 3 is an elevation of the safety device shown in another position than that of Figs. 1 and 2. Fig. 4 is a section on the line A—A of Fig. 1. Fig. 5 is a section on the line B—B of Fig. 1.

A gas cooking range 1 of any suitable design is provided with a mixing tube 2 with air slot 3 and a gas inlet pipe 4 with a tap 5, said inlet pipe to be connected with the gas conduit by means of a rubber tube. The mixing tube 2 is preferably separated from its extension in the gas range by means of an insulating flange 6. Thus the heat of the range when in service is only partly and not to a disturbing measure conducted to the mixing tube 2. On the mixing tube 2 a saddle 7 made of some suitable material is provided. This saddle has an opening 8 with a slot 9 on its upper side.

A ball 10 is of such a size that it cannot slip through the opening 8, when the saddle 7 and the ball 10 have the same or nearly the same temperature. The ball 10 is attached to a link 11 which with a guide tube 12 attached thereto pivots around the crosspieces of a hook-link 13, said hook-link being pivotally mounted on pins 14 of the mixing tube 2. The hook-link 13 is drawn toward the gas range by means of springs 15, which at one end are attached to the hook-link and with the other extremity to eyes 16 of the saddle 7. By this arrangement the ball 10 is pressed against the edge of the opening 8 as shown in Figs. 1 and 2. This is the normal position of the device ready for acting. However as soon as the flame strikes back into the mixing tube the opening 8 is dilated by the heating of the tube 2 and the saddle 7, and the ball, drawn by the springs 15, slips through the opening. The hook-link 13 rotates on its pins 14 in a direction toward the gas range, whereby a connecting rod 17, with one extremity attached to the hook-link and with the other extremity pivotally connected to the valve of the cock 5, closes the latter. The device then assumes the position as shown in Fig. 3. As soon as the ball has slipped through the opening 8, two hinged bridges or wings 18 rotatably mounted on pins of the saddle 7 are lifted by the ball; said wings falling back into their normal position after the ball has passed underneath. Between these hinged wings or bridges a small space is left, said space serving as a passage for the link 11. Each of these wings is provided with a projection 19 in order that they may not be flung backward by the sudden movement of the ball and thus get out of order. Any other suitable construction for preventing the bridges from taking a wrong position may be provided. After the cock has been automatically closed, the ball rests in a groove 20 (see Fig. 4), which is suitably shaped for quickly conducting the heat of the mixing tube 2 to the ball; said ball by taking the same or nearly the same temperature as the mixing tube and the saddle expands so much that it cannot slip through the opening 8 after being brought back in the position of Fig. 1 by hand.

In lighting the burner again the cock 5 is opened by hand, thereby tensioning the springs 15 by means of the connecting rod 17 and the hook-link 13 and drawing back the ball 10 which now slides over the hinged wings or bridges 18 and the saddle 7 falling back behind said saddle. As soon as this happens the cock is turned slightly from its fully opened position and in releasing the cock the same is drawn back into its fully opened position by means of the springs 15. The ball is thereby pressed against the edge of the opening 8 and as in the meantime it has expanded sufficiently it will not slip through the opening (see above).

The opening 8 is provided at such a height over the upper side of the tube 2 that the ball does not touch the tube. In this way or if desired by some other arrangement, i. e. by making the opening 8 not exactly circular in order that the ball will touch the edges of the opening only in a few points, the ball will be prevented from absorbing the heat from the saddle 7 so quickly that the same will dilate to such an extent that it cannot pass through the opening.

The connecting rod 17 is provided with an oblong eye 21, by which it is rendered possible to regulate or to shut off the flow of the gas while the safety device remains in its normal or active position.

To the gas range or to the insulating flange 6 a heat protecting screen 22 may be attached thus preventing an unfavorable influence being exerted on the safety device by a sideway movement of the flame. It is also advisable to provide a protecting cover over the device.

The measure of expansion may if desired be enlarged between certain limits by replacing the saddle 7 by an element which consists of two different metals having a different coefficient of dilatation. In this way the surfaces which prevent the passing of the ball may be given a larger degree of dilatation. This method of acquiring relatively large movements by the dilatation of bodies is known *per se* and it is only mentioned here for indicating how the construction of the safety device may be modified by applying well known means without affecting the nature of this invention.

It will be understood that the application of the safety device according to this invention is not limited to protecting gas cooking ranges, but it may be applied to all gas burning apparatus where the flashing back of a gas flame may cause damage or trouble.

Having now described my invention what I claim as new and desire to secure by Letters Patent is:—

1. A safety device for gas burners and the like including in combination with a burner and a gas inlet pipe, a mixing tube between said burner and inlet pipe, a shutoff valve for said inlet pipe, thermostatic means carried by said mixing tube, said means having an opening, and spring tension means connected at one end with said shutoff valve and provided at its other end with an enlargement, said opening in the thermostatic means normally preventing the passage of the enlargement of said spring tension means therethrough.

2. A safety device for gas burners and the like comprising in combination with the mixing tube thereof, an element dilating under the influence of the temperature of the same mixing tube, a second, spring tensioned, element in its normal position being prevented from moving by said first element and being allowed to move upon dilation of said first element caused by extraordinary heating of the mixing tube, means controlled by the movement of said second element for shutting off the flow of gas, and means for returning the second element to its normal position during the opening of the gas jet over another path than that followed in its initial movement.

3. A safety device for gas burners and the like including in combination with the burner, a mixing tube insulated from said burner, a shutoff valve communicating with said tube, thermostatic means integral with said tube and having an opening, and a spring tensioned member connected at one end to the shutoff valve and having its other end normally bearing against the rim of the opening in the thermostatic means, said spring tensioned member adapted to pass through the opening of the thermostatic member when the latter becomes dilated by heat thereby closing the valve.

4. A safety device for gas burners and the like including in combination with the burner, a mixing tube having an insulated connection with said burner and a groove adjacent thereto, a shutoff valve in communication with said tube, a thermostatic element having an opening carried by said tube, a spring tensioned valve closing member connected at one end to the said valve and having its other end normally held by spring tension against the rim of the opening in the thermostatic element, and wings hinged at one end to the thermostatic element and having their other ends resting on the top of said groove, said valve closing member adapted to move under spring tension through the opening in the thermostatic element when the latter is dilated by heat to close the valve.

In testimony whereof I affix my signature in presence of two witnesses.

ISIDORE DE HAAN.

Witnesses:
AL JANISUS,
A. C. NELSON.